J. W. CORINGTON.
AUTOMATIC DOSER AND SELF FEEDER.
APPLICATION FILED MAR. 17, 1920.
1,396,257.
Patented Nov. 8, 1921.
3 SHEETS—SHEET 1.
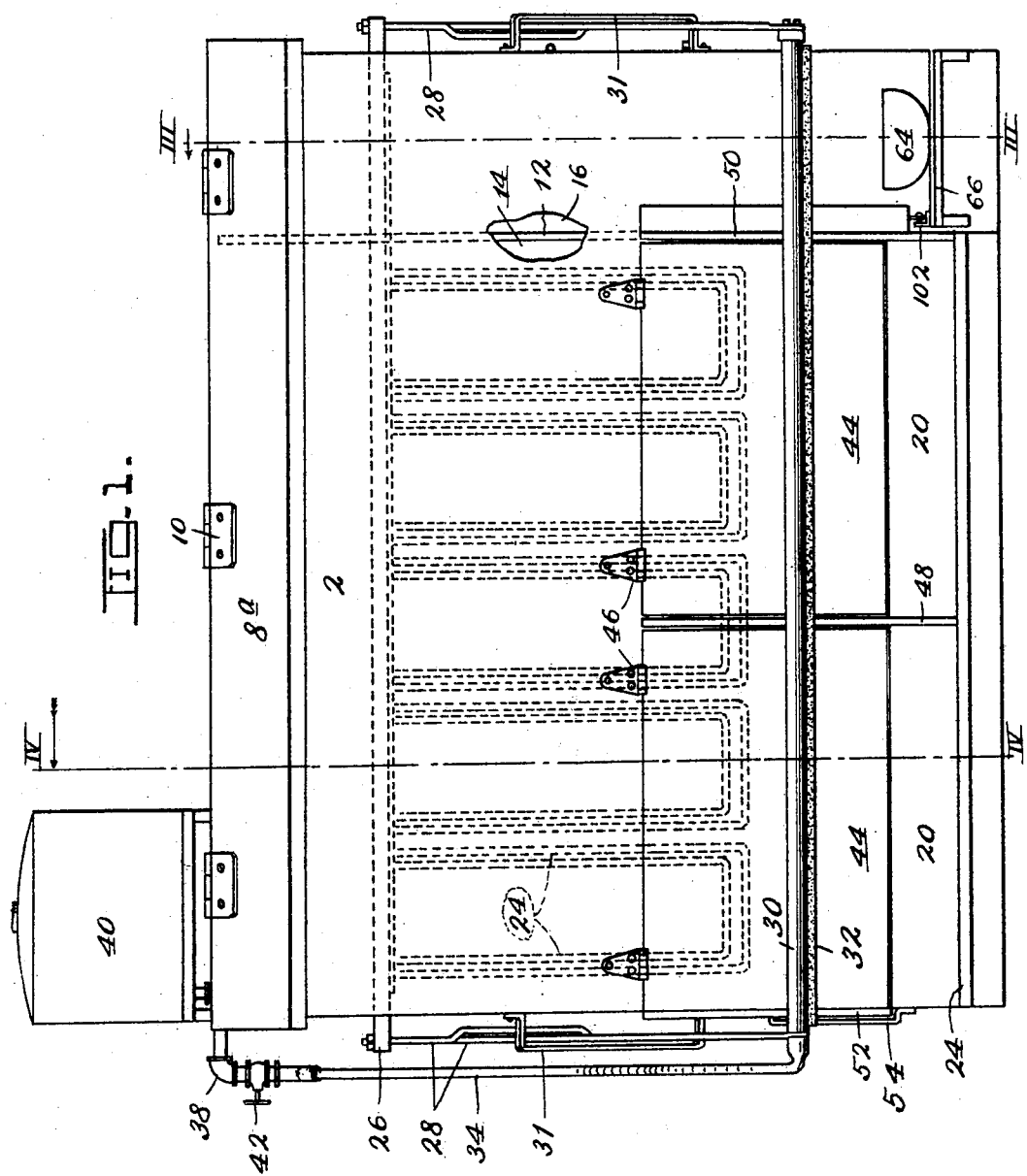
WITNESS:
INVENTOR:
James W. Corington,
BY
ATTORNEY.

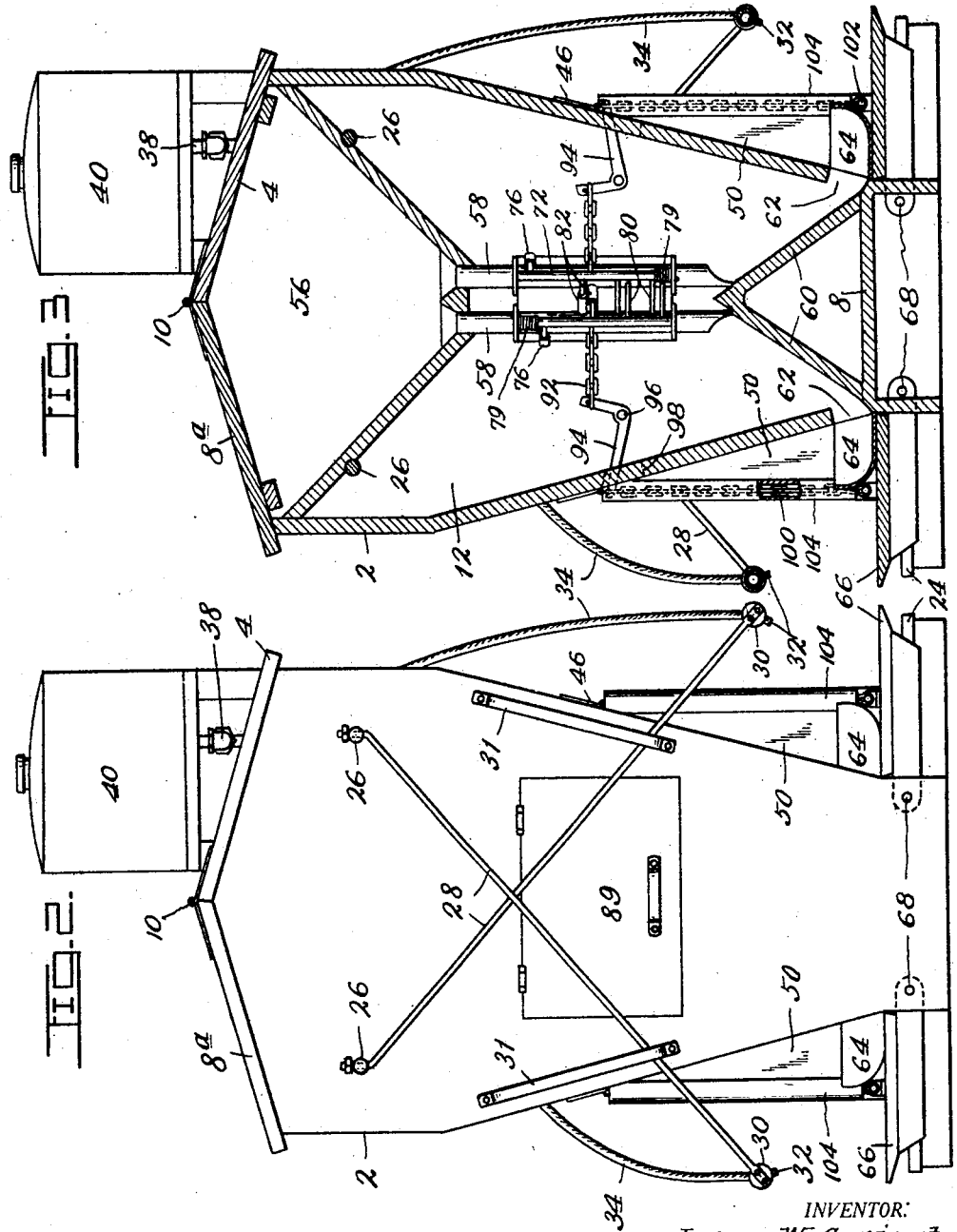

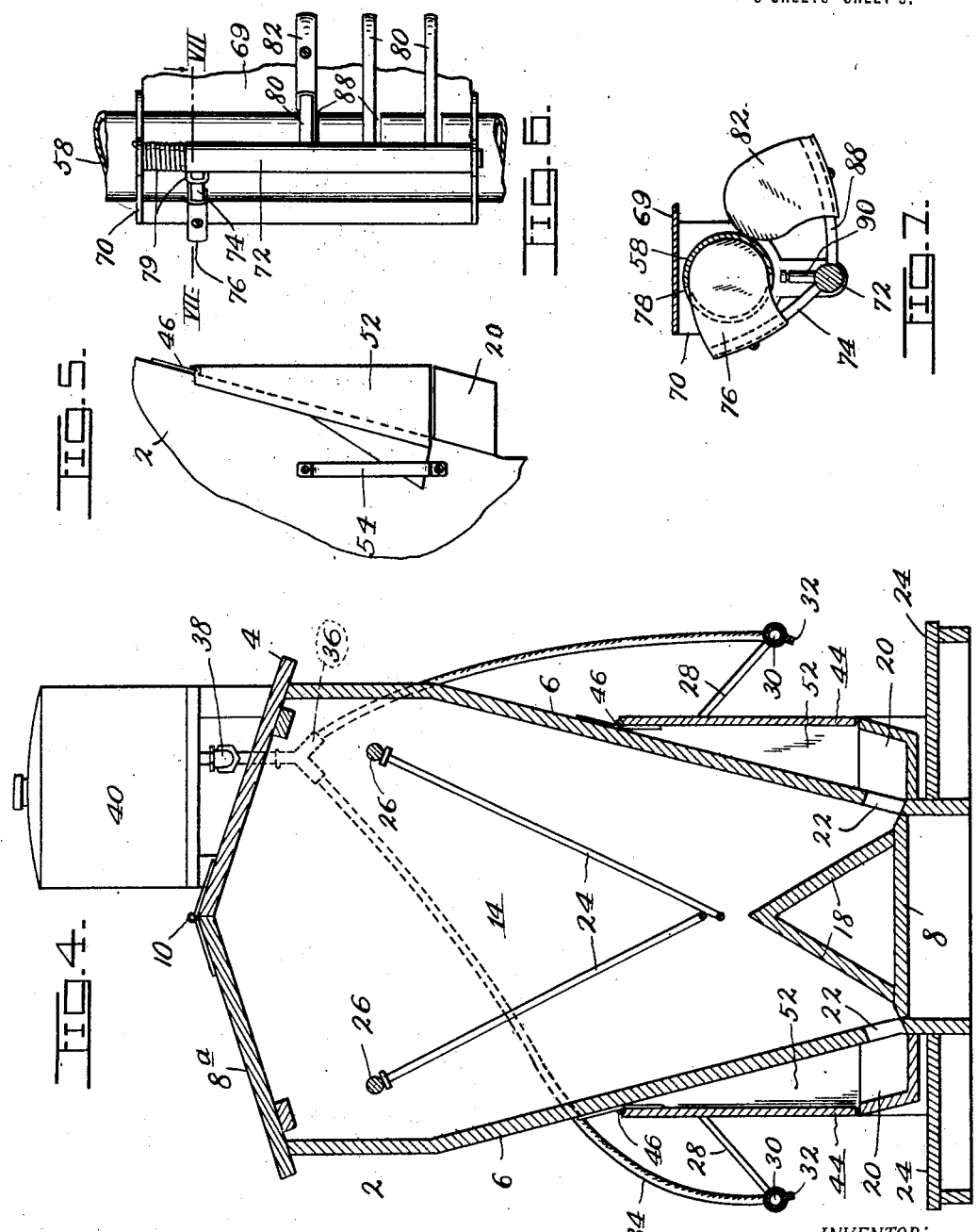

UNITED STATES PATENT OFFICE.

JAMES W. CORINGTON, OF FAUCETT, MISSOURI.

AUTOMATIC DOSER AND SELF-FEEDER.

1,396,257.  Specification of Letters Patent.  Patented Nov. 8, 1921.

Application filed March 17, 1920. Serial No. 366,566.

*To all whom it may concern:*

Be it known that I, JAMES W. CORINGTON, a citizen of the United States, residing at Faucett, in the county of Buchanan and State of Missouri, have invented certain new and useful Improvements in Automatic Dosers and Self-Feeders, of which the following is a specification.

My invention relates to a self-feeder and automatic doser for hogs, sheep and other domestic animals, and one object is to provide an apparatus of this character which will exclude small animals and fowls from the feed but in which said feed is readily accessible to larger animals such as hogs, sheep, etc.

Another object is to provide an apparatus of this character in which a dose of tonic or medicine may be automatically fed to a hog or other animal, and means by which the amount of said dose may be regulated.

A further object is to provide an oiling device in combination with the self-feeder, by means of which hogs and other animals on approaching the troughs of said self-feeder are supplied with crude oil or the like for ridding them of lice, mange, etc.

A further object is to provide automatic means for preventing the self feeder from becoming clogged and thereby failing to function properly.

With the above and other objects which will hereinafter appear, reference will now be had to the accompanying drawings, in which:

Figure 1 is a side elevation of the apparatus.

Fig. 2 is an end elevation of the apparatus.

Fig. 3 is a vertical cross section through the automatic doser, on line III—III of Fig. 1.

Fig. 4 is a vertical cross section through the feeder, on line IV—IV of Fig. 1.

Fig. 5 is a fragment of one end of the apparatus.

Fig. 6 is a broken detail elevation of certain of the valves and associated mechanism, for regulating the size of the dose of tonic or medicine.

Fig. 7 is a cross section on line VII—VII of Fig. 6.

In carrying out the invention, I employ a bin 2 embodying a top 4, sloping sides 6 and a bottom 8. The upper portion of the bin is provided with a lid 8ª connected to the top 4 by hinges 10. The bin 2 is divided by a vertical partition 12 into a relatively large feed compartment 14 and a smaller medicine or tonic compartment 16. The bottom 8 of the bin 2 is provided with longitudinal diverting guide boards 18, which direct the feed into troughs 20 through openings 22 extending longitudinally of the lower portions of the sides 6. Platforms 24 extending beneath the troughs 20 are provided for the animals to stand upon while feeding.

The compartment 14 is provided with agitators 24 to prevent the feed from becoming clogged therein. Said agitators embody opposítely-disposed rock shafts 26 extending longitudinally through the upper portion of the bin and journaled in the ends thereof. Each shaft 26 is provided at its ends with fixedly-mounted arms 28, the arms connected to one shaft crossing the arms on the other shaft, as disclosed on Fig. 2, and connected at their lower ends to pipes 30 extending longitudinally of the bin 2. Keepers 31 are secured to the ends of the bin 2, to limit the downward movement of the arms 28.

The pipes 30 are provided at their under portions with longitudinal slots in which wicks 32 are placed. The pipes 30 are connected to sections of hose or other flexible tubing 34, arranged adjacent to one end of the bin 2 and connected at their upper ends to a T-coupling 36, which in turn is connected to a supply pipe 38 leading from the bottom of a tank 40 containing a liquid remedy such as crude oil for lice, mange, etc. The flow of liquid through the supply pipe 38 is controlled by a valve 42.

Fowls and small animals are prevented from gaining access to the feed in the troughs 20 by guards 44 swingably connected to the sides 6 of the bin by hinges 46. As shown more clearly on Fig. 1, each trough 20 is provided with two guards 44, which depend over the front edges of said troughs 20 and are spaced from each other by suitable partitions 48. By hanging the guards 44 from the hinges 46 as shown and described they may be readily pushed backwardly to open position by a hog, against the sloping sides 6 of the bin 2 and expose the feed in the troughs 20.

When the guards 44 are in closed position as shown more clearly on Fig. 4, fowls and small animals are prevented from gaining access to the ends of the troughs 20 by shields 50 and 52. The shields 50 are fixed to the sides 6 of the bin 2, near one end of the latter, while the shields 52 are secured to the ends of the guards 44 adjacent to the opposite end of the bin 2, as disclosed on Figs. 1 and 5. The free edges of the shields 52 extend beneath keepers 54, fixed to the adjacent end of the bin 2 and are prevented by said keepers 54 from being pryed off their respective guards 44 by fowls and small animals.

Referring now more particularly to the compartment 16 and its mechanism shown more clearly on Figs. 3, 6 and 7, 56 designates a hopper in the upper portion of said compartment 16 for holding medicine or tonic in powder or granular form. The bottom of the hopper 56 communicates with two measuring tubes 58 leading down to the inverted V-shaped bottom 60 of the compartment 16. The bottom 60 slopes in opposite directions to openings 62 in the sides 6 of the bin 2. Said openings 62 communicate with cups 64, which project over swinging platforms 66 mounted on pivots 68 secured to the lower portion of the bin 2.

The measuring tubes 58 are firmly secured to the partition 12 by a plate 69, provided at its upper and lower portions with outturned flanges 70 in which the tubes 58 are fixed and rock-shafts 72 are journaled. Each rock-shaft 72 is provided at its upper portion with an arm 74, carrying a valve 76 operating through a slot 78 in the associated tube 58 and normally held in closed position by a coil spring 79. The lower portion of each shaft 72 is provided with a series of arms 80, any one of which is adapted to receive a valve 82 provided with a set screw 86 whereby it is removably secured in position. The valve 82 is adapted to enter any of the slots 88 in the associated tube 58. As shown more clearly on Fig. 6, the valve 82 is mounted in the present instance on the upper arm 80 to permit a minimum dose to pass through the associated tube 58. If a larger dose is desired, the valve 82 is removed to the intermediate arm 80, and if the maximum dose is desired said valve 82 is placed on the lowermost arm 80.

Access is gained to the valves 76 and 82 through a door 89 in the adjacent end of the bin 2.

The rock shafts 72 are provided with cranks 90 to which chains 92 are connected at one end, the opposite ends of said chains being connected to bell-cranks 94 mounted on pivots 96 supported by the partition 12. One arm of each bell-crank 94 projects through a slot 98 in the adjacent wall 6 of the bin 2 and is connected to a chain or other cable 100, extending downwardly and connected at its lower end to a fastening 102 fixed to the associated platform 66. The chains 100 are protected from contact with the hogs by sheet metal guards 104 fixed to the shields 50.

The operation in general is as follows: The lid 8$^a$ is raised and the compartment 14 is supplied with feed, while the hopper 56 is supplied with medicine or tonic. As a hog steps upon one of the platforms 24, he swings the adjacent guard 44 inwardly to gain access to the feed, while his back rubs against the wick 32 and is thereby coated with the crude oil or other liquid remedy in the pipe 30. He also raises the pipe 30 and actuates the associated agitator 24 through the intermediacy of the arms 28, so that in case the feed has become clogged it will be loosened and flow freely to the troughs 20. If the hog desires a dose of tonic or medicine he steps upon one of the platforms 66 to gain access to one of the cups 64, and in so doing depresses said platform 66, which through the intermediacy of the connecting mechanism, rocks the associated shaft, causing it to swing the upper valve 76 to open position and close the lower valve 82. A portion of the medicine in the hopper 56 then flows downwardly and fills the tube 58 to the depth of the lower valve 82. After the hog has partaken of the medicine in the cup and steps off the platform 56, the spring 79 immediately rocks the shaft 72, which closes the upper valve 76 and opens the lower valve 82, so that the measured charge of medicine between said valves may pass downwardly through the tube 58 and into the cup 64.

From the foregoing description, it will be apparent that I have produced an apparatus embodying the advantages above set forth, and while I have shown and described the preferred construction, combination and arrangement of parts, I reserve the right to make such changes as properly fall within the spirit and scope of the claims.

Having thus described my invention, what I claim and desire to secure by Letters Patent, is:

1. In an apparatus of the character described, a bin having a lid at its upper portion and openings in its lower portion for the discharge of feed, troughs associated with the bin to receive the feed, agitators in the bin to prevent the feed from clogging, rock-shafts journaled in the bin and to which said agitators are fixed, exterior arms crossing each other and connected at their upper ends to said rock-shafts, keepers fixed to the ends of the bin to limit the downward movement of said arms and means connecting the lower ends of the arms in pairs and whereby animals approaching the troughs actuate the agitators by lifting said means with their backs.

2. In an apparatus of the character described, a bin having an opening in its lower portion for the discharge of feed, a trough to receive the feed, a guard swingably mounted on the bin and normally closing the front portion of the trough, means associated with the ends of said guard and overlapping the ends of the bin to prevent access to the ends of the trough, and keepers fixed to the ends of the bin to prevent dislocation of said means.

3. In an apparatus of the character described, a bin having an opening for the discharge of feed, a tube disposed in the path of animals approaching the opening and provided with an opening for the discharge of a liquid remedy upon the animals, means for supplying said tube with a liquid remedy, and an agitator within the bin and actuated by said tube.

4. In an apparatus of the character described, a bin having a hopper in its upper portion and openings in its lower portion, measuring tubes communicating with the lower portion of the hopper, valves associated with said measuring tubes, cables for actuating said valves, bell-cranks connected to said cables, movable platforms adjacent the openings, cables connecting the bell-cranks and said movable platforms whereby the latter actuated the former, diverging guides beneath the measuring tubes and leading to the openings, and cups associated with the openings for the purpose set forth and described.

In testimony whereof I affix my signature, in the presence of two witnesses.

JAMES W. CORINGTON.

Witnesses:
F. G. FISCHER,
L. J. FISCHER.